G. W. RICHARDSON.
SLIDE RULE.
APPLICATION FILED APR. 4, 1916.
1,260,454.
Patented Mar. 26, 1918.
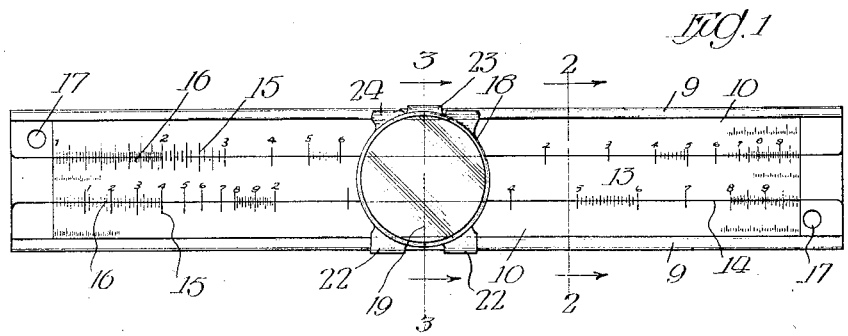
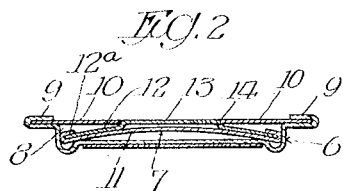
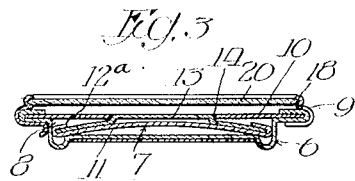
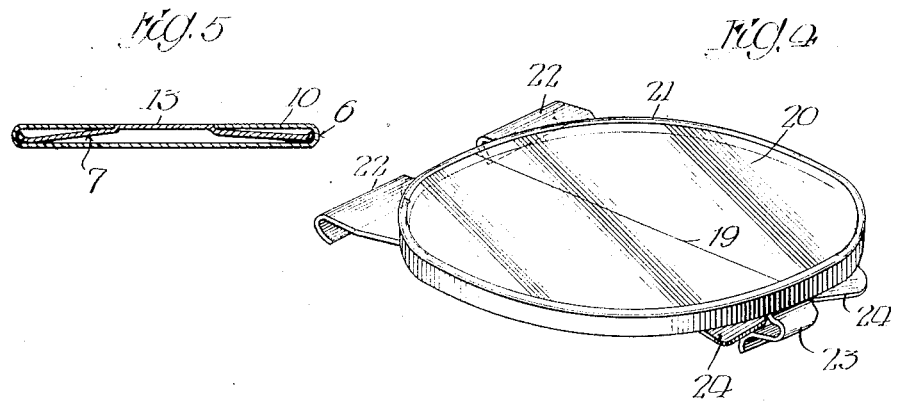
Witnesses:
Inventor:
George W. Richardson
By [signature] Atty

UNITED STATES PATENT OFFICE.

GEORGE W. RICHARDSON, OF CHICAGO, ILLINOIS.

SLIDE-RULE.

1,260,454.  Specification of Letters Patent.  Patented Mar. 26, 1918.

Application filed April 4, 1916. Serial No. 88,784.

*To all whom it may concern:*

Be it known that I, GEORGE W. RICHARDSON, a citizen of the United States, residing at Chicago, in the county of Cook and State of Illinois, have invented certain new and useful Improvements in Slide-Rules, of which the following is a specification.

The present invention relates to a slide rule of the general style and principle shown and described in Letters Patent No. 982,876, granted to me January 31, 1911, and No. 1,021,484, granted to me March 26, 1912.

The objects of the present invention are, to so arrange the various telescoping parts of the rule as to bring the scale-marked surfaces thereof into the same plane, eliminating any breaks or depressions which would interfere with quick and accurate reading; to provide a rule which has a free sliding movement, unimpeded by any material amount of frictional resistance, and which will be so guided and centered in its various movements as to eliminate play or binding between the parts; and to provide a runner for the rule which will be so constructed and arranged as to have a window portion large enough to enable a free and easy reading of the rule, and which will have a slidable mounting upon the rule of a character that will eliminate play, which would be detrimental to the proper operation.

The invention further consists in the features of construction and combination of parts hereinafter described and claimed.

In the drawings:

Figure 1 is a face view of the rule of the present invention;

Fig. 2, a cross section on line 2—2 of Fig. 1, looking in the direction of the arrows;

Fig. 3, a cross section on line 3—3 of Fig. 1, looking in the direction of the arrows;

Fig. 4, a perspective detail of the runner; and

Fig. 5, a cross section of a modified form of construction.

In the art to which the present invention relates, slide rules are made with a body portion which has thereon two oppositely-disposed scale surfaces, which are spaced apart from one another; and mounted in telescopic relation to this body portion is a member or part carrying a scale surface, which scale surface lies between the two scale surfaces of the body portion, and by a manipulation of the movable part, the various scales are so positioned as to obtain the answer to various given problems.

In the present invention, the rule is of an all-metal construction, and is so arranged and configured as to permit a quick and accurate reading of the various scale surfaces.

Referring now to the drawings, the rule comprises what may be termed a body or fixed portion 6, and an inner or slidable portion 7, the latter being arranged in telescopic relation to the body portion. The body portion, as shown in Figs. 1, 2 and 3, is bent to form a channel 8, and at its upper end is bent back upon itself to form overhanging lips 9. These lips provide oppositely-disposed grooves along the upper side edges of the body, into each of which grooves is inserted a plate 10. Each plate is formed with a scale marking at the outer part of its upper face. The inner edges of these plates 10 are spaced apart from one another, as will be apparent from the drawings, the purpose of which will hereinafter appear.

The slidable portion 7 of the rule is intended to move within the channel 8 of the body portion, and, as shown in Figs. 1, 2 and 3, comprises a carrying plate 11 bent back along its side edges to provide overhanging ears 12$^a$, which produce grooves along each side edge of the plate 11. Into these grooves are inserted the ends of a plate 12, which is offset at its center to provide a raised portion 13. This raised portion is of a size to have a sliding fit between the edges of the plates 10 of the body portion, and is raised a sufficient height so that its upper face lies flush, or approximately flush, with the upper faces of the plates 10 and said raised portion constitutes a longitudinally extending stiffening rib for the slide member.

The forming of the raised portion produces shoulders 14, which engage with the outer edges of the plates 10, so that the sliding member is guided and supported by the edges of these plates 10 and the shoulders 14, in addition to the guide or support furnished to it by reason of the side edges of the carrying plate 11 engaging the inner walls of the channel 8 of the body portion. Thus, two guide and centering means are provided for the sliding member, insuring against a wabbling of the same, which would be detrimental to the free and accurate operation of the rule.

It will furthermore be seen from the drawings, that the slidable portion of the rule is so bent and configured as to have relatively small portions of it engaging with the body portion. This, of course, reduces the friction incident to the moving of the slidable portion and renders the rule easy of use. It is the intention to make the raised portion 13 of the sliding member so that its upper face lies flush with the upper face of the plates 10, although precise exact alinement in every case is practically impossible. Small allowances must be made for the variances which are bound to occur in the manufacture of the various parts. The same is true of the contact between this sliding portion and the outer edges of the plates 10.

It is desired to have the shoulders 14 contact with the edges of these plates 10 to an extent to assist in the guiding and centering of the sliding portion 7, but it is not desired to have the shoulders 14 engage with the edges of the plates to the extent that a binding would result, or a wearing of the parts occur from the use of the rule.

As stated, the plates 10 have their upper faces provided with scale-marks 15, and the raised portion 13 has its upper face provided with coöperating scale-marks 16, the scale-marks 15 and 16 being used for the purpose of obtaining the result desired in the usual way in which these slide rules are manipulated.

Each plate 10 is formed with a sight opening 17, for the purpose of admitting an easy adjustment of the sliding portions 7 with respect to the body in accordance with the problem which is being computed. The principle of these sight openings and the supplemental scale-marks on the sliding portion 7 is fully shown and described in my Patents No. 982,876 and No. 1,021,484 heretofore referred to, and need not be discussed at the present time.

The rule is provided with a runner 18, which is employed in the usual manner for reading the results of the calculations for which the rule is employed. In the use of these slides, it frequently occurs that a reading must be obtained some distance upon each side of the indicating mark 19 in the window or transparent portion 20 of the runner. I have, therefore, provided a frame for the window 20, consisting of a circular ring 21, which is grooved to receive the edges of the window 20. This allows of a quick and easy assemblance between the window and frame, and also gives the maximum amount of window space unimpeded by the opaque portions of the frame, enabling a reading to be had for a substantial distance upon each side of the indicating mark 19.

This runner 18 must, of course, be mounted upon the body of the rule to travel back and forth, and to accomplish this I provide companion clips 22 on one side of the frame and a single clip 23 on the opposite side. This gives a three-point engagement between the runner and the body of the rule, which, as is well known in mechanics, is a very firm and rigid form of engagement, eliminating wabbling or play which would likely be present in a construction having a four-point engagement. By the use of this three-point mounting, I eliminate the use of springs or other auxiliary devices which would otherwise have to be employed to obtain the firm engagement necessary between the body of the rule and the runner.

In the construction shown, I have placed finger pieces 24 to each side of the clip 23. The construction shown in Fig. 5 is identical in all respects with the principle of the construction of Figs. 1, 2 and 3, the change being merely in the form of construction of the parts. In Fig. 5 the plates 10 are formed as an integral part of the body 6 in place of being supplemental parts joined to the body, as in Figs. 1, 2 and 3, and the sliding portion 7 is of a one-piece construction in place of the two-piece construction of Figs. 1, 2 and 3. Otherwise, the form and operation of the construction of Fig. 5 is identical with the construction of the other figures.

I claim:

A slide rule comprising a channel-like outer metallic section formed with a longitudinally extending slot in its upper face, scale markings on said upper face adjacent said slot, an inner section formed of sheet metal and adapted to slide within the channel part of the outer section, a longitudinally extending raised portion on the inner section adapted to enter the slot in the outer section, the outer side edges of said inner section having a sliding contact with the inner side edges of the outer section and the outer side edges of the raised portion having a sliding engagement with the walls of the longitudinal slot, whereby the inner section is held at four points against transverse movement within the outer section, scale markings on the upper face of the raised portion, said raised portion constituting a longitudinally extending stiffening rib for the inner section to prevent its flexing when pulled out, and also serving as a means for bringing the scale markings on the inner and outer sections into a common level to expedite reading of results, substantially as described.

GEORGE W. RICHARDSON.